(12) United States Patent
Lee et al.

(10) Patent No.: US 9,406,070 B2
(45) Date of Patent: Aug. 2, 2016

(54) APPARATUS AND METHOD FOR MANAGING ADVERTISEMENT APPLICATION

(75) Inventors: Ji-Hye Lee, Suwon-si (KR); Hae-Young Jun, Anyang-si (KR); Seok-Hoon Choi, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 1147 days.

(21) Appl. No.: 12/581,623

(22) Filed: Oct. 19, 2009

(65) Prior Publication Data

US 2010/0100615 A1    Apr. 22, 2010

(30) Foreign Application Priority Data

Oct. 17, 2008 (KR) .......... 10-2008-0102228
Dec. 5, 2008 (KR) .......... 10-2008-0123616

(51) Int. Cl.
    *G06Q 30/02* (2012.01)
(52) U.S. Cl.
    CPC ............ *G06Q 30/02* (2013.01); *G06Q 30/0251* (2013.01); *G06Q 30/0276* (2013.01); *G06Q 30/0277* (2013.01)
(58) Field of Classification Search
    None
    See application file for complete search history.

(56) References Cited

U.S. PATENT DOCUMENTS

| | | | | |
|---|---|---|---|---|
| 5,263,120 A * | 11/1993 | Bickel | .................. | G06K 9/6218 704/200 |
| 5,715,397 A * | 2/1998 | Ogawa | .............. | G06F 17/30569 370/420 |
| 6,502,076 B1 * | 12/2002 | Smith | .................... | G06Q 30/02 705/14.54 |
| 6,829,780 B2 * | 12/2004 | Kraft | ...................... | G06Q 30/02 705/14.42 |
| 6,839,681 B1 * | 1/2005 | Hotz | ..................... | G06Q 30/02 705/14.41 |
| 6,883,000 B1 * | 4/2005 | Gropper | ............ | G06Q 10/1093 |
| 7,523,016 B1 * | 4/2009 | Surdulescu | .......... | G06F 21/316 702/185 |
| 7,702,720 B1 * | 4/2010 | Franke | ................... | G06Q 10/10 705/37 |
| 7,933,798 B1 * | 4/2011 | Yan | ........................ | G06Q 30/02 705/14.42 |

(Continued)

FOREIGN PATENT DOCUMENTS

| | | |
|---|---|---|
| KR | 1020010091545 | 10/2001 |
| KR | 1020060018031 | 2/2006 |

(Continued)

OTHER PUBLICATIONS

Korean Office Action dated Dec. 18, 2015 issued in counterpart application No. 10-2008-0123616, 6 pages.

*Primary Examiner* — Ninos Donabed
(74) *Attorney, Agent, or Firm* — The Farrell Law Firm, P.C.

(57) ABSTRACT

A method and apparatus for managing an advertisement application in a mobile advertising system is provided. When an advertisement application for representing an advertisement is installed in an advertisement-receiving terminal, a registration request for the installed advertisement application is made. The advertisement-receiving terminal assigns an application Identifier (ID) to the advertisement application in response to the registration request, and stores a profile of the advertisement application in association with the assigned application ID.

9 Claims, 7 Drawing Sheets

(56) References Cited

U.S. PATENT DOCUMENTS

| | | | |
|---|---|---|---|
| 7,962,604 B1* | 6/2011 | Morris | G06Q 30/02 705/14.4 |
| 8,010,404 B1* | 8/2011 | Wu | G06Q 30/02 705/1.1 |
| 8,321,275 B2* | 11/2012 | Collins | G06F 17/2785 705/14.42 |
| 2001/0049824 A1* | 12/2001 | Baker et al. | 725/109 |
| 2002/0069105 A1* | 6/2002 | do Rosario Botelho et al. | G06F 17/30867 705/14.53 |
| 2002/0147637 A1* | 10/2002 | Kraft | G06Q 30/02 705/14.42 |
| 2002/0184097 A1* | 12/2002 | Hijiri | G06Q 30/02 705/14.55 |
| 2002/0196275 A1* | 12/2002 | Willner | G06Q 30/02 715/744 |
| 2003/0037033 A1* | 2/2003 | Nyman | H04L 29/12264 |
| 2003/0046165 A1* | 3/2003 | Topel | G06Q 30/02 705/14.49 |
| 2003/0069788 A1* | 4/2003 | Han | G06F 17/30867 705/14.52 |
| 2003/0172376 A1* | 9/2003 | Coffin, III | G06Q 30/02 725/22 |
| 2004/0015580 A1* | 1/2004 | Lu | G06F 11/3495 709/224 |
| 2004/0030598 A1* | 2/2004 | Boal | G06Q 30/02 705/14.25 |
| 2004/0133469 A1* | 7/2004 | Chang | G06Q 30/0255 705/14.53 |
| 2004/0148221 A1* | 7/2004 | Chu | A63F 13/12 705/14.51 |
| 2004/0236620 A1* | 11/2004 | Chauhan et al. | 705/9 |
| 2005/0021397 A1* | 1/2005 | Cui | G06Q 30/02 705/14.42 |
| 2005/0038900 A1* | 2/2005 | Krassner | G06Q 30/02 709/231 |
| 2005/0086283 A1* | 4/2005 | Marshall | H04L 67/02 709/200 |
| 2005/0188400 A1* | 8/2005 | Topel | G06Q 30/02 725/36 |
| 2006/0064348 A1* | 3/2006 | Li | G06Q 30/0261 705/14.58 |
| 2006/0156283 A1* | 7/2006 | Landau | G06Q 30/02 717/114 |
| 2006/0212589 A1* | 9/2006 | Hayer et al. | 709/229 |
| 2007/0033104 A1* | 2/2007 | Collins | G06F 17/2785 705/14.41 |
| 2007/0050257 A1* | 3/2007 | Fine | G06Q 30/02 705/14.56 |
| 2007/0150353 A1* | 6/2007 | Krassner | G06Q 30/00 705/14.64 |
| 2007/0153703 A1* | 7/2007 | Floyd | G06Q 30/00 370/252 |
| 2007/0157227 A1* | 7/2007 | Carpenter | G06Q 30/02 725/32 |
| 2007/0265923 A1* | 11/2007 | Krassner | G06Q 30/02 705/14.51 |
| 2008/0004958 A1* | 1/2008 | Ralph | G06Q 30/02 705/14.45 |
| 2008/0086559 A1* | 4/2008 | Davis | G06F 11/3438 709/224 |
| 2008/0126159 A1 | 5/2008 | Wee et al. | |
| 2008/0172545 A1* | 7/2008 | Boucard | G06Q 30/02 711/221 |
| 2008/0177603 A1* | 7/2008 | Muthugopalakrishnan | G06Q 30/02 705/14.26 |
| 2008/0195475 A1* | 8/2008 | Lambert | G06Q 30/0207 705/14.1 |
| 2008/0201227 A1* | 8/2008 | Bakewell | G06Q 30/0217 705/14.19 |
| 2008/0201742 A1* | 8/2008 | Gu et al. | 725/42 |
| 2008/0256201 A1* | 10/2008 | Flowers | G06F 15/16 709/206 |
| 2008/0270242 A1* | 10/2008 | Aaltonen | 705/14 |
| 2009/0006177 A1* | 1/2009 | Beaver | G06Q 30/02 705/14.6 |
| 2009/0012841 A1* | 1/2009 | Saft et al. | 705/10 |
| 2009/0018907 A1* | 1/2009 | McCarthy | G06Q 30/02 705/14.46 |
| 2009/0048912 A1* | 2/2009 | Shenfield et al. | 705/14 |
| 2009/0048913 A1* | 2/2009 | Shenfield et al. | 705/14 |
| 2009/0048914 A1* | 2/2009 | Shenfield et al. | 705/14 |
| 2009/0049090 A1* | 2/2009 | Shenfield et al. | 707/104.1 |
| 2009/0112724 A1 | 4/2009 | Joo | |
| 2009/0171721 A1* | 7/2009 | LeBaron | G06F 17/30864 705/14.54 |
| 2009/0192901 A1* | 7/2009 | Egeresi | G06Q 50/12 705/15 |
| 2009/0247140 A1* | 10/2009 | Gupta et al. | 455/418 |
| 2009/0287561 A1* | 11/2009 | Rybak et al. | 705/14.26 |
| 2010/0036711 A1* | 2/2010 | Shenfield et al. | 705/10 |
| 2010/0036737 A1* | 2/2010 | Shenfield et al. | 705/14.59 |
| 2010/0042504 A1* | 2/2010 | Shenfield et al. | 705/14.73 |
| 2010/0094703 A1* | 4/2010 | Bramley et al. | 705/14.45 |
| 2010/0146079 A1* | 6/2010 | Bramley et al. | 709/219 |

FOREIGN PATENT DOCUMENTS

| | | |
|---|---|---|
| KR | 1020070076402 | 7/2007 |
| KR | 1020070114061 | 11/2007 |
| KR | 1020080004711 | 1/2008 |
| KR | 1020080048185 | 6/2008 |

* cited by examiner

APPARATUS AND METHOD FOR MANAGING ADVERTISEMENT APPLICATION

PRIORITY

This application claims priority under 35 U.S.C. §119(a) to a Korean Patent Application filed in the Korean Intellectual Property Office on Oct. 17, 2008 and assigned Serial No. 10-2008-0102228, and a Korean Patent Application filed in the Korean Intellectual Property Office on Dec. 5, 2008 and assigned Serial No. 10-2008-0123616, the contents of both of which are incorporated herein by reference.

BACKGROUND OF THE INVENTION

1. Field of the Invention

The present invention relates generally to a mobile advertising system offering differentiated personalized Mobile Advertising (MobAd) services to users, and more particularly, to an apparatus and method for managing advertisement applications stored in a terminal receiving advertisements in a mobile advertising system.

2. Description of the Related Art

The Open Mobile Alliance (OMA) is a group which studies the standard for interworking between individual mobile solutions. The OMA serves to define various application standards for mobile games, Internet services and the like. Of the OMA working groups, Open Mobile Alliance REQuirement (OMA REQ) Working Group and Open Mobile Alliance Content Delivery (OMA CD) Working Group are conducting research on the technology standard for offering MobAd services.

With reference to FIG. 1, a description will be made of components and their operation in a mobile advertising system to which the mobile advertising service technology is applied.

FIG. 1 illustrates components and interfaces between them in a conventional mobile advertising system. Referring to FIG. 1, the mobile advertising system mainly includes an Advertising Engine (Ad Engine) and an Advertising Server (Ad Server). The Ad Engine corresponds to an advertising client 100 and the Ad Server to an advertising server 110.

The advertising client 100 is a functional group of logical modules, and situated in a terminal where it receives advertisements and accesses to the advertising server 110 using a To Be Determined (TBD)-2 interface. The advertising client 100 interacts with several different Advertisement Applications (Ad App) 130. The advertisement application 130 supports a useful function capable of accessing a mobile advertising service provided by the advertising client 100, and uses a TBD-3 interface for communication with the advertising client 100. In addition, the advertising client 100 exchanges service management information with the advertising server 110, receives a proper advertisement from the advertising server 110, manages the received advertisement, selects an advertisement from a storage in the terminal, provides an advertisement-related feedback to the advertising server 110, and performs filtering.

The advertising server 110 provides a network function based on an application regarding a mobile advertising service. The advertising server 110 exchanges service management information with the advertising client 100, and provides an advertisement and an advertisement notification to the advertising client 100. A TBD-1 interface is used between the advertising server 110 and a Service Provider Application (SP App) 120 that provides mobile advertisements. A Contextualization and Personalization (C&P) module 140 communicates with the advertising server 110 using a TBD-4 interface, and with the advertising client 100 using a TBD-5 interface.

The mobile advertising system of FIG. 1 may deliver advertisements in two different methods. In a first method, the advertising server 110 provides an advertisement in reply to an advertisement request from a terminal. That is, when there is a new advertisement or when the existing advertisement is updated, the advertising client 100 may send a request for the advertisement and the advertisement metadata to the advertising server 110 using an advertisement request message. Then the advertising server 110 may deliver to the advertising client 100 in the terminal a personalized advertisement created by considering contextual information such as a location of the terminal's user and the stored state, and personalization information such as user's sex, age, hobbies and interests.

Upon receiving an advertisement request message from the advertisement application 130 after caching or storing the advertisement(s) provided from the advertising server 110, the advertising client 100 selects an advertisement satisfying a certain condition, and delivers the selected advertisement to the advertisement application 130. The advertisement request message may have profile information including a format, a codec, a screen size, a resolution and the like supportable by the advertisement application 130, such as flash, image, audio, video and text.

If there is no advertisement being matched to an application profile among the advertisements stored in the advertising client 100, the advertising client 100 sends an advertisement request message including the application profile to the advertising server 110. Then, advertising server 110 searches for an advertisement being matched to the application profile included in the advertisement request message, and delivers the searched advertisement to the advertising client 100.

In a second method, without a request from the advertising client 100, the advertising server 110 directly delivers an arbitrary advertisement to the advertising client 100 in a timely manner.

However, the conventional mobile advertising system is incapable of managing the advertisement applications installed in the terminal. Thus, even though the advertising client 100 has cached the advertisements downloaded from the advertising server 110, if a plurality of advertisement applications is installed in the terminal, it is difficult to find a matched advertisement application. Hence, the advertising client 100 may inefficiently deliver the same advertisement to each of the plural advertisement applications. Otherwise, the advertising client 100 must select an optimal application from among the plural advertisement applications installed in the terminal, but the selection is impossible in the conventional system. In addition, the advertising client 100 must download and install the advertisement application if it is not already installed in the terminal. However, since the advertisement implementation is delayed, the advertisement provider may not provide the advertisement to the user at a desired time.

Such problems may be resolved if the advertising server 110 selects during advertisement delivery an optimal advertisement for the terminal and designates an optimal advertisement application that will represent the selected advertisement. Since the conventional advertising server 110 cannot detect information about the advertisement applications installed in the terminal, it has a problem in selecting the optimal advertisement and/or designating the optimal advertisement application that will represent the selected advertisement.

Moreover, every time the advertisement application sends an advertisement request message to the advertising client 100, it must inconveniently transmit an application profile in the message, thereby increasing a message capacity and thus compromising efficiency of network resources.

SUMMARY OF THE INVENTION

An aspect of the present invention is to address at least the above-mentioned problems and/or disadvantages and to provide at least the advantages described below. Accordingly, an aspect of the present invention provides an apparatus and method capable of managing advertisement applications installed in a terminal.

Another aspect of the present invention provides an apparatus and method capable of delivering an advertisement optimized for a terminal.

A further aspect of the present invention provides an apparatus and method capable of delivering and implementing an advertisement at the desired time of an advertisement provider.

According to the present invention, there is provided a method for managing an advertisement application in a mobile advertising system, including making a registration request for an installed advertisement application, when an advertisement application for representing an advertisement is installed in an advertisement-receiving terminal, assigning, by the advertisement-receiving terminal, an application IDentifier (ID) to the advertisement application in response to the registration request, and storing a profile of the advertisement application in association with the assigned application ID.

According to the present invention, there is provided a method for managing an advertisement application in a mobile advertising system, including sending, by an advertisement-receiving terminal, a registration request message for an advertisement application installed in the advertisement-receiving terminal, to an advertising server, and upon receipt of the registration request message, assigning, by the advertising server, an application ID to the advertisement application, and storing a profile of the advertisement application, which is included in the registration request message, in association with the application ID, thereby storing advertisement application information of the advertisement-receiving terminal.

According to the present invention, there is provided a method for managing an advertisement application in a mobile advertising system, including receiving, by an advertising server, a notification indicating execution of an advertisement application from an advertisement-receiving terminal whenever an advertisement application for representing an advertisement is executed in the advertisement-receiving terminal, and updating, by the advertising server, an executing-advertisement application list corresponding to the advertisement-receiving terminal upon every receipt of the notification.

According to the present invention, there is provided a method for managing an advertisement application in a mobile advertising system, including sending to the advertisement-receiving terminal, by an advertising server, a request for a list of advertisement applications currently being executed in an advertisement-receiving terminal, and receiving, by the advertising server, the list from the advertisement-receiving terminal.

According to the present invention, there is provided an apparatus for managing an advertisement application in an advertisement-receiving terminal supporting a mobile advertising service, including at least one advertisement application for representing an advertisement and requesting registration thereof, and an advertising client for assigning an application ID to each of the at least one advertisement applications in response to the registration request, and storing a profile of each of the advertisement applications in association with the assigned application ID.

According to the present invention, there is provided an apparatus for managing an advertisement application in an advertising server supporting a mobile advertising service, including an advertisement application information storage unit, and an advertisement application information management unit for, upon receipt of a registration request message for an advertisement application stored in a advertisement-receiving terminal from the advertisement-receiving terminal, assigning an application ID to the advertisement application, and storing a profile of the advertisement application included in the registration request message in the advertisement application information storage unit in association with the application ID, thereby storing advertisement application information of the advertisement-receiving terminal.

According to the present invention, there is provided an apparatus for managing an advertisement application in an advertising server supporting a mobile advertising service, including an advertisement application information management unit for receiving a notification indicating the execution of an advertisement application from the advertisement-receiving terminal, whenever an advertisement application for representing an advertisement is executed in an advertisement-receiving terminal, and updating an executing-advertisement application list corresponding to the advertisement-receiving terminal upon every receipt of the notification, and an advertisement application information storage unit for storing the executing-advertisement application list.

According to the present invention, there is provided an apparatus for managing an advertisement application in an advertising server supporting a mobile advertising service, including an advertisement application information management unit for sending to an advertisement-receiving terminal a request for a list for advertisement applications currently being executed in the advertisement-receiving terminal, and receiving the list from the advertisement-receiving terminal, and an advertisement application information storage unit for storing the list.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF THE EMBODIMENTS

The matters defined in the description such as a detailed construction and elements are provided to assist in a comprehensive understanding of embodiments of the invention. Accordingly, those of ordinary skill in the art will recognize that various changes and modifications of the embodiments described herein can be made without departing from the scope and spirit of the invention. Also, descriptions of well-known functions and constructions are omitted for the sake of clarity and conciseness.

Although names of entities defined in $3^{rd}$ Generation Partnership Project (3GPP) which is a $3^{rd}$ generation mobile communication standard, or MobAd of OMA will be used for a better understanding of the present invention, these standards and names are not intended to limit the scope of the present invention, and the invention can be applied to any other system of a similar technical scope.

Generally, the mobile advertising system includes an advertisement provider for providing an advertisement such as a specific company or an organization, an advertising server for delivering the advertisement provided from the advertisement provider to a terminal, the terminal for receiving the advertisement from the advertising server, and a network for enabling information exchange between the advertising server and the advertising terminal.

Figure 1:
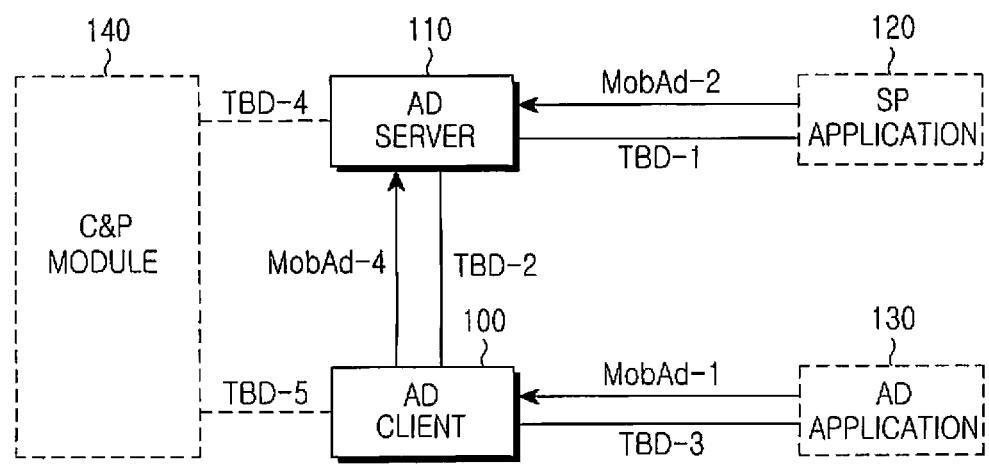
FIG. 1 illustrates components and interfaces in a conventional mobile advertising system.
Figure 2:
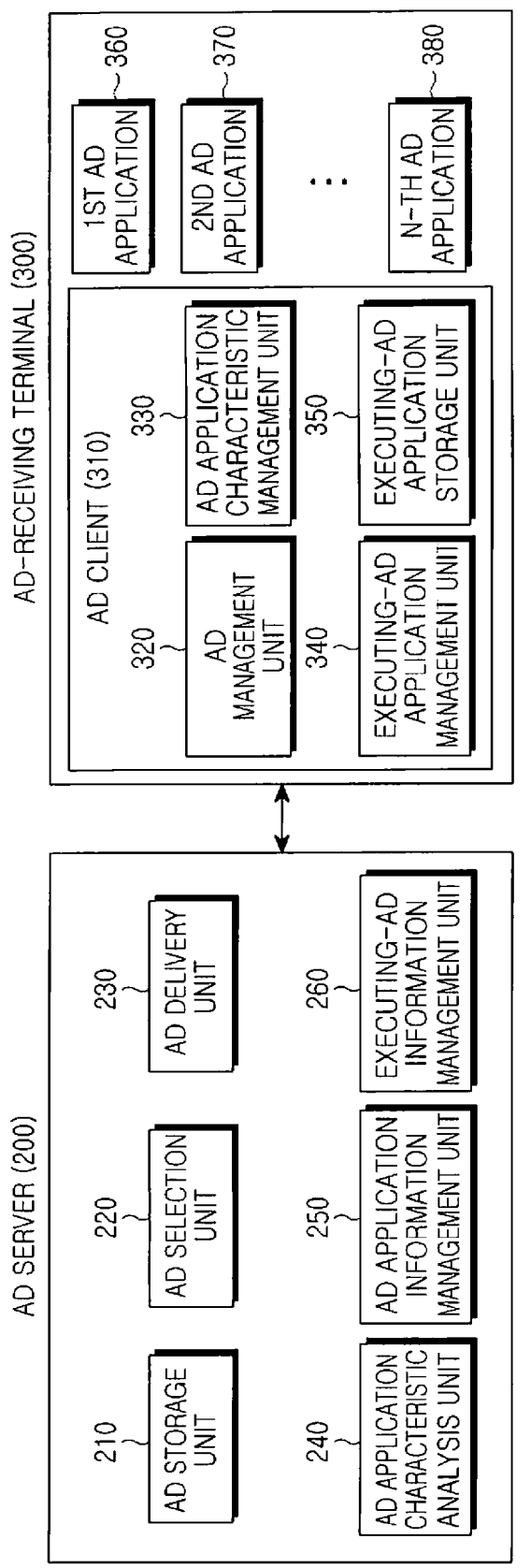
FIG. 2 illustrates structures of an advertising server and an advertisement-receiving terminal according to the present invention.

FIG. 2 illustrates the components of the mobile advertising system, the advertising server and the advertising terminal, to which the present invention is applied. Referring to FIG. 2, the advertising server 200 stores an advertisement provided from the advertisement provider, and delivers the advertisement in response to a request from the terminal or a request from the advertisement provider. The advertising server 200 can store and manage information about an advertisement application installed in the terminal, together with user's preference, personalization information, and contextual information of the user terminal. Hence, the advertising server 200 can select and deliver an advertisement optimized for the user and/or the terminal.

In accordance with the present invention, the advertising server 200 includes an advertisement storage unit 210, an advertisement selection unit 220, an advertisement delivery unit 230, an advertisement application characteristic analysis unit 240, an advertisement application information management unit 250, and an executing-advertisement application information storage unit 260.

The advertisement storage unit 210 stores advertisements provided from the advertisement provider such as an advertiser or a company.

The advertisement application information management unit 250 stores information about an advertisement application(s) installed in each terminal, which is collected from an advertising client in each terminal receiving an advertisement. The advertisement application information includes a profile of each advertisement application and an ID assigned to each advertisement application. Each terminal can deliver the advertisement application information to the advertising server 200 periodically or when necessary, or this information can be delivered to the advertising server 200 in response to a request made by the advertisement application information management unit 250. The advertisement application information management unit 250 collects and stores information about an advertisement application that each terminal is currently executing. Also, the executing-advertisement application information corresponding to each terminal can be collected by a spontaneous report from the terminal, or can be collected in response to a request from the advertisement application information management unit 250.

The executing-advertisement application information storage unit 260 stores each terminal's advertisement application information and executing-advertisement application information collected by the advertisement application information management unit 250.

The advertisement application characteristic analysis unit 240 analyzes a profile characteristic of each advertisement application, such as a screen size, a resolution and a supportable format, using each terminal's advertisement application information stored in the executing-advertisement application information storage unit 260.

The advertisement selection unit 220 selects an advertisement to be delivered to each terminal, considering the advertisement application information stored in the executing-advertisement application information storage unit 260, the analysis result by the advertisement application characteristic analysis unit 240, a user's preference stored in association with the user or each terminal, personalization information, and user terminal's contextual information, and requests from the advertisement providers.

In particular, according to the present invention, the advertisement selection unit 220 can determine an advertisement application that will represent advertisement content to be delivered, by finding an advertisement application installed in each terminal or that each terminal is currently executing, and can select an advertisement having a format associated with a profile characteristic of the determined advertisement application. The advertisement selection by the advertisement selection unit 220 can be achieved with or without a request from the terminal. The advertisement selection unit 220 delivers to the terminal the selected advertisement, or the selected advertisement and information about an application that will represent the selected advertisement, via the advertisement delivery unit 230.

A terminal 300 receiving the advertisement from the advertising server 200 includes an advertising client 310 and at least one of $1^{st}$, $2^{nd}$ and Nth advertisement applications 360, 370 and 380.

Each of the advertisement applications 360, 370 and 380 represents an advertisement, and can be, for example, a text viewer and a video player supporting various video formats.

According to the present invention, the advertising client 310 may include an advertisement management unit 320, an advertisement application characteristic management unit 330, an executing-advertisement application management unit 340, and an executing-advertisement application storage unit 350.

The advertisement management unit 320 receives an advertisement delivered from the advertising server 200, stores the received advertisement, and delivers the stored advertisement to a target advertisement application among the advertisement applications 360, 370 and 380. The term "target advertisement application" indicates an advertisement application that can optimally represent the advertisement. For example, if the advertisement is a video, the optimal advertisement application could be a video player. The advertising server 200 can determine the target advertisement application and the determination result can be delivered to the advertising client 310 together during advertisement delivery. Also, the target advertisement application can be directly determined by the advertising client 310.

The advertisement application characteristic management unit 330 stores an application profile's characteristic provided from each of the advertisement applications 360, 370 and 380, and delivers it to the advertising server 200 as needed.

The executing-advertisement application management unit 340 determines the currently executed advertisement application and the de-registered advertisement application, based on a notification received at the time any one of the advertisement applications 360, 370 and 380 is executed or terminated (or de-registered). The executing-advertisement application management unit 340 manages an executing-advertisement application list stored in the executing-advertisement application storage unit 350 according to the determination. The executing-advertisement application management unit 340 delivers the executing-advertisement application list stored in the executing-advertisement application storage unit 350 to the advertising server 200 as needed.

Figure 3:
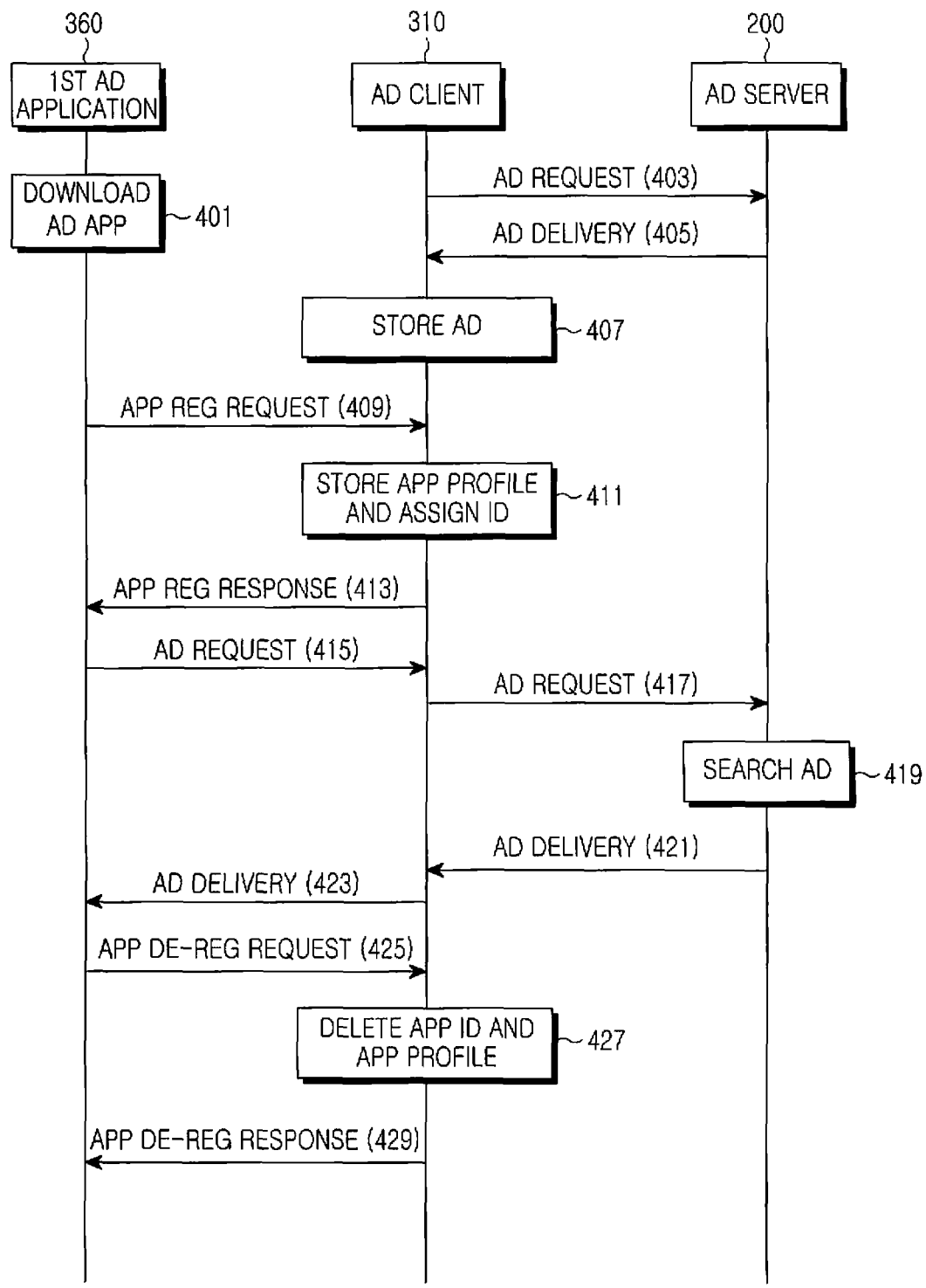
FIGS. 3 and 4 illustrate processes of registering an advertisement application according to first and second embodiments of the present invention, respectively.

FIG. 3 illustrates a process of registering an advertisement application in an advertisement-receiving terminal 300 according to a first embodiment of the present invention.

Referring to FIG. 3, a user can download a first advertisement application 360 in the terminal 300 in step 401. The advertising client 310 sends an advertisement request message to the advertising server 200 in step 403, receives an advertisement from the advertising server 200 in step 405, and stores the received advertisement in the terminal 300 in step 407. Metadata is also delivered when the advertisement is delivered by the advertising server 200.

Thereafter, in step 409, the first advertisement application 360 sends an application registration request message with its application profile to the advertising client 310, in order to register an application in the advertising client 310. For example, an application can be registered in the advertising client while the advertisement application is being downloaded in the terminal. In step 411, the advertising client 310 assigns an application ID to the first advertisement application 360, and stores the application profile in association with the application ID.

In step 413, the advertising client 310 sends to the first advertisement application 360 an application registration response message including the assigned application ID, the registered state, a list of the advertisements stored in step 407, and the advertisement metadata. Although the application ID is assigned by the advertising client 310 in the above process, the application ID may be assigned by the advertisement application. In this case, the application ID may be included in an application profile in an application registration request message. If the application ID is included in the application registration request message, no application ID may be included in the application registration response message.

In step 415, the user may select a desired advertisement from among the advertisements included in the advertisement list using the first advertisement application 360, and the first advertisement application 360 sends to the advertising client 310 an advertisement request message that includes the registered application ID and advertisement metadata corresponding to the advertisement desired by the user. The advertising client 310 determines whether an advertisement matched with (or included in) the received advertisement request message exists in the stored messages. If the advertisement exists, the advertising client 310 determines whether an advertisement application corresponding to an advertisement ID included in the advertisement request message can represent the advertisement. If there is an advertisement meeting all these conditions, the advertising client 310 transmits the advertisement and the advertisement metadata to the first advertisement application 360.

If there is no matched advertisement, the advertising client 310 sends to the advertising server 200 an advertisement request message that includes an application profile corresponding to the stored application ID, in step 417. For example, if there is an advertisement requested for the first advertisement application 360 but the advertisement has a format that cannot be represented by the first advertisement application 360, the advertising client 310 requests the advertising server 200 to provide an advertisement in a proper format. The advertising server 200 searches for the matched advertisement and the advertisement metadata in step 419, and delivers them to the advertising client 310 in step 421.

In step 423, the advertising client 310 delivers the received advertisement to the first advertisement application 360.

Thereafter, in step 425, the first advertisement application 360 includes its application ID in an application de-registration request message and sends it to the advertising client 310, when it intends to de-register the application from the advertising client 310. For example, the advertisement application de-registration can be performed in the process of uninstalling the installed advertisement application. In step 427, the advertising client 310 deletes an application ID of the first advertisement application 360 and an application profile corresponding to the application ID. In step 429, the advertising client 310 sends to the first advertisement application 360 an application de-registration response message that includes information such as the deleted application ID and the de-registered state.

As described above, the advertising client 310 finds an advertisement application stored in the terminal 300, assigns an application ID to the advertisement application and manages the advertisement application, thereby reducing a capacity of the message exchanged between the first advertisement application 360 and the advertising client 310. Conventionally, because no application ID would be assigned, a profile of the advertisement application would be included in the advertisement request message in step 415, causing an increase in the capacity of the advertisement request message.

In case of the method in which the advertising server 200 delivers an advertisement to the terminal and stores it therein without an advertisement request from the terminal, the advertising server 200 can previously deliver an advertisement optimized for each of the advertisement applications to the advertising client 310 by requesting and receiving the advertisement application list and profile stored in the advertising client 310.

Figure 4:
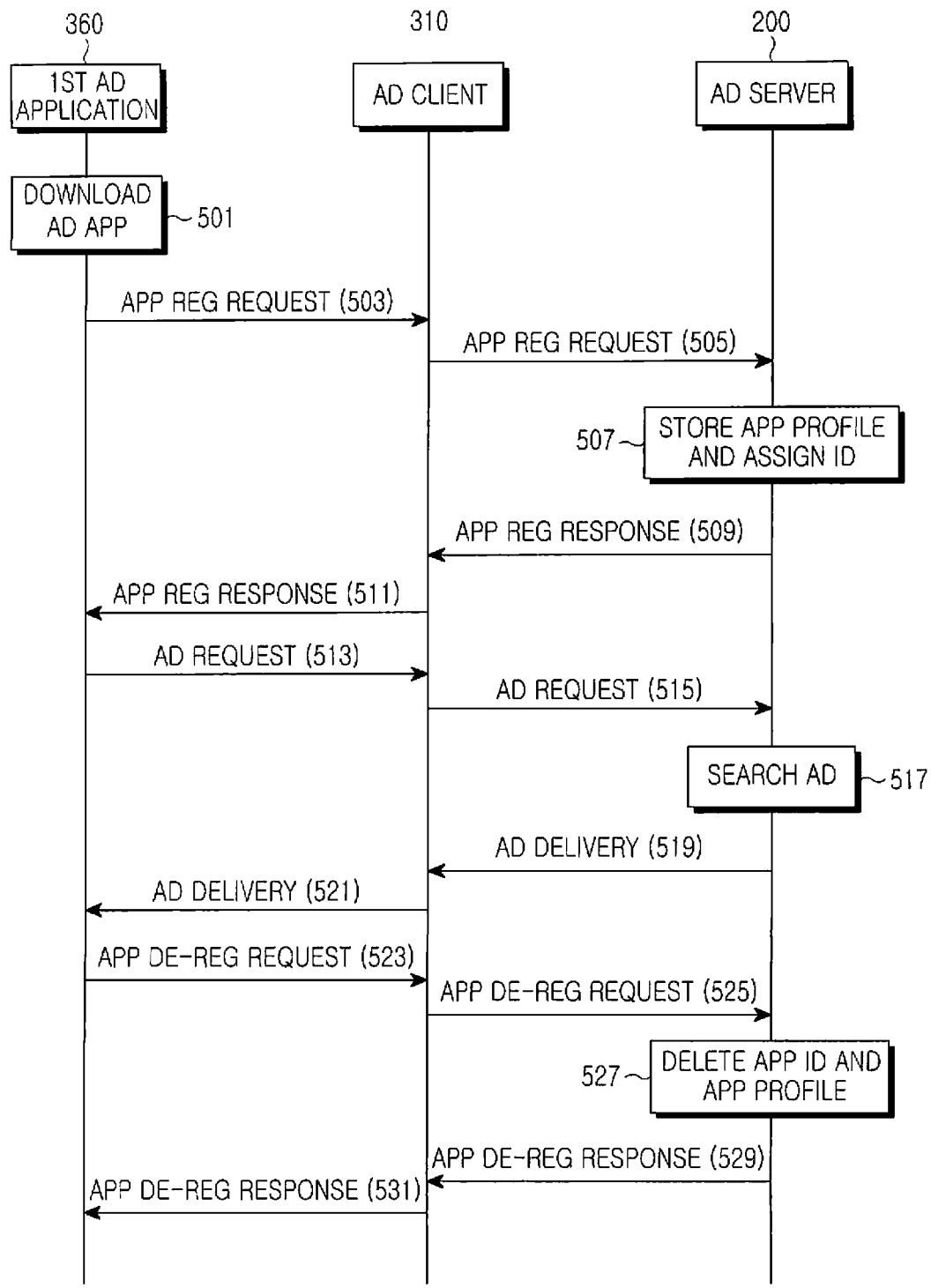

FIG. 4 illustrates a process of registering an application in an advertising server 200 according to a second embodiment of the present invention.

Referring to FIG. 4, if a user downloads the first advertisement application 360 and installs it in the terminal 300 in step 501, the first advertisement application 360 delivers an application registration request message with an application profile to the advertising client 310 in step 503. In step 505, the advertising client 310 forwards the application registration request message to the advertising server 200. In step 507, the advertising server 200 stores the application profile and assigns an ID. In step 509, the advertising server 200 sends to the advertising client 310 an application registration response message that includes information such as the assigned application ID, the registered state, a list of advertisements delivered to the advertisement-receiving terminal 300, and advertisement metadata.

Regarding the list of advertisements delivered to the advertisement-receiving terminal 300, the advertising server 200 may update the list by checking it during every advertisement delivery, or may be provided with the list from the advertising client 310 in step 505. In step 511, the advertising client 310 forwards the application registration response message to the first advertisement application 360. Alternatively, an ID for the advertisement application may be assigned by the advertising client 310 after step 503, and the application ID may be included in an application profile in the application registration request message in step 505. In this case, an application ID in the application registration response message may be omitted.

Thereafter, in order to receive the advertisement desired by the user, the first advertisement application 360 sends the advertising client 310 an advertisement request message including the application ID and advertisement metadata corresponding to the desired advertisement, in step 513. In step 515, the advertising client 310 forwards the advertisement request message to the advertising server 200. In step 517, the advertising server 200 searches for the already stored application profile using the application ID included in the advertisement request message, and searches for a personalized advertisement created by considering contextual information such a location of a user of the terminal 300 and the stored state, and personalization information such as user's sex, age, hobbies and interests, as well as the searched application profile information. The advertising server 200 delivers the searched advertisement to the advertising client 310 in step 519, and the advertising client 310 delivers the advertisement to the first advertisement application 360 in step 521.

In step 523, when the first advertisement application 360 intends to de-register the application, it includes the application ID in an application de-registration request message and sends it to the advertising client 310. In step 525, the advertising client 310 forwards the application de-registration request message to the advertising server 200. In step 527, the advertising server 200 deletes the application ID and profile corresponding to the application. In step 529, the advertising server 200 sends to the advertising client 310 an application de-registration response message that includes information such as the deleted application ID and the de-registered state. In step 531, the advertising client 310 forwards the application de-registration response message to the first advertisement application 360.

Although not specified in the above steps, the processes of receiving, from the advertisement-receiving terminal 300, a registration request message for an advertisement application stored in the advertisement-receiving terminal 300, assigning an application ID to the advertisement application, storing a profile of the advertisement application included in the registration request message in the advertisement application information storage unit 260 in association with the application ID, and storing information about the advertisement application in the advertisement-receiving terminal 300, may be performed by the advertisement application information management unit 250.

According to the present invention, since the advertising server 200 has stored information about the advertisement application stored in the advertisement-receiving terminal 300, it may select and deliver the advertisement optimal for the advertisement-receiving terminal 300. Although not illustrated in FIG. 4, even though there is no advertisement request from the advertising client 310, the advertising server 200 may select a proper advertisement considering the advertisement applications stored in the advertisement-receiving terminal 300. In addition, the advertising server 200 may deliver the selected advertisement to the advertisement-receiving terminal 300 together with an application ID of the advertisement application that will represent the advertisement.

However, if the advertisement application designated by the advertising server 200 to represent the advertisement, i.e. the target advertisement application, is not being executed in the advertisement-receiving terminal 300, the advertisement-receiving terminal 300 needs time to represent the received advertisement. If the advertising server 200 designates the target advertisement application as an advertisement application that the advertisement-receiving terminal 300 is currently executing, the advertisement may be provided to the user faster.

Figure 5:
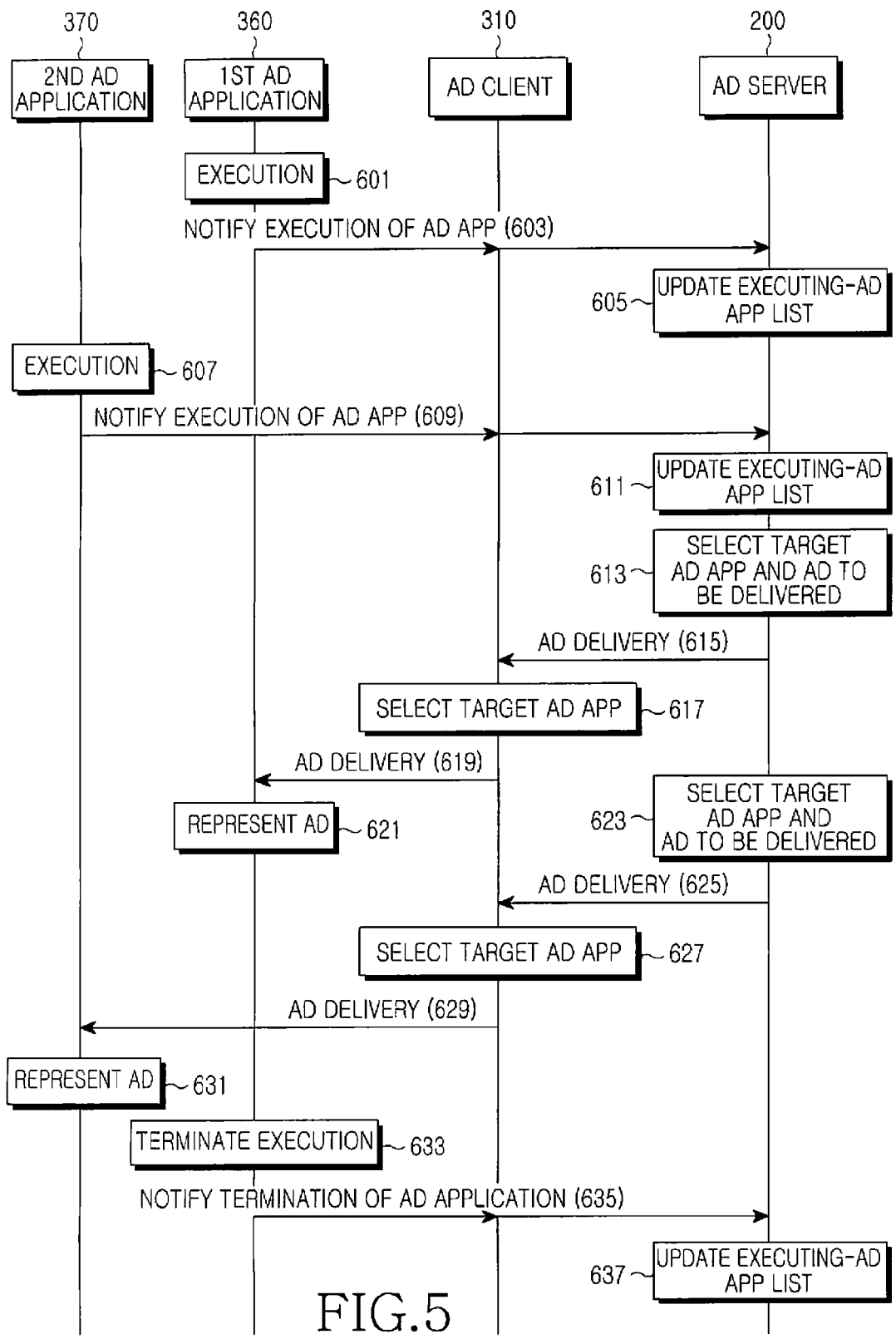
FIGS. 5 and 6 illustrate processes of updating an executing-advertisement application list according to third and fourth embodiments of the present invention, respectively.
Figure 6:
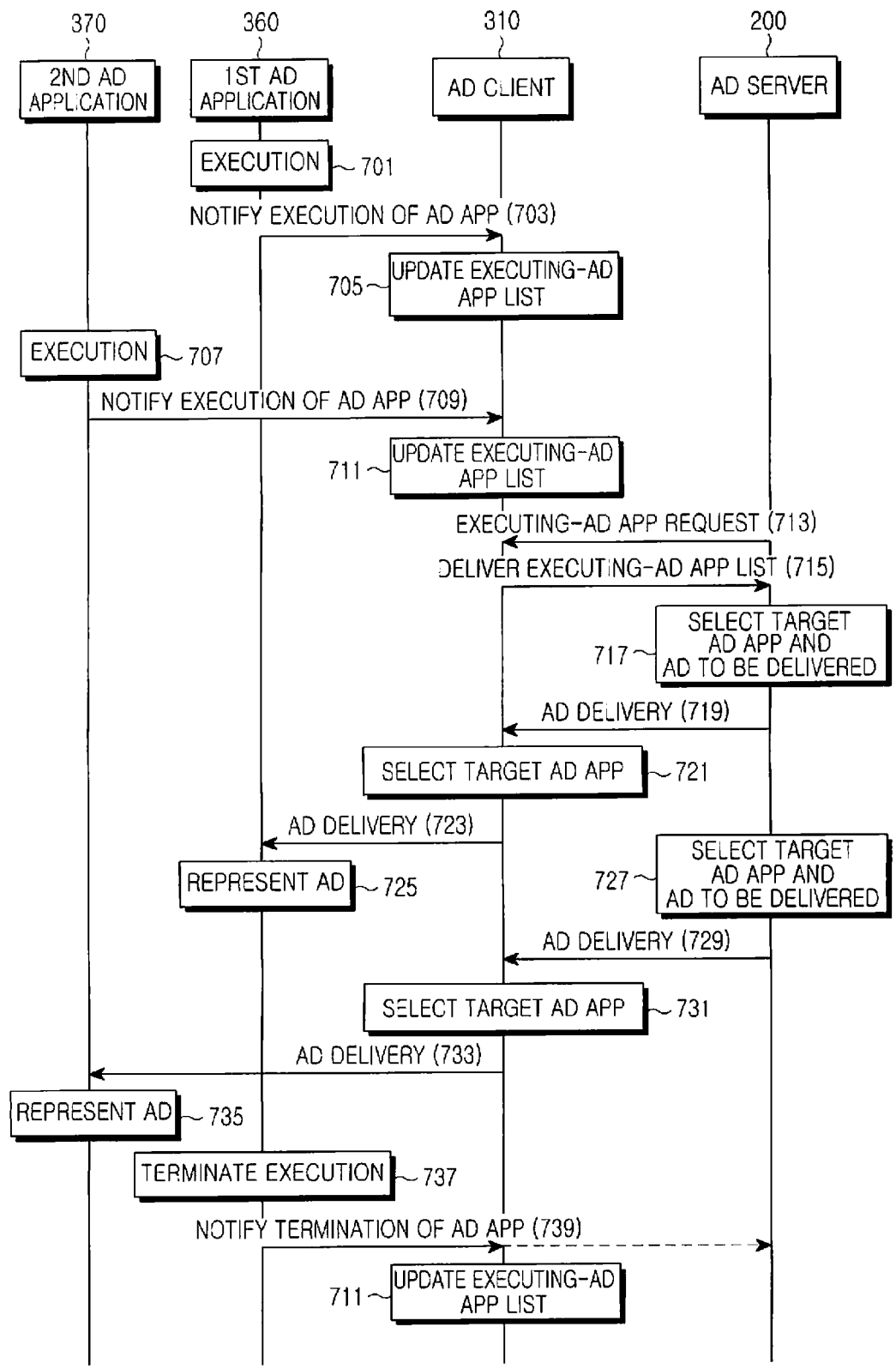

FIGS. 5 and 6 illustrate processes of updating an executing-advertisement application list according to third and fourth embodiments of the present invention, respectively.

In accordance with the third embodiment illustrated in FIG. 5, every time an advertisement application is executed, the advertisement application notifies the advertising server 200 of the execution in order that the advertising server 200 may obtain a list of advertisement applications currently being executed in the terminal 300.

Referring to FIG. 5, when a first advertisement application 360 is executed in step 601, the first advertisement application 360 notifies the advertising client 310 of its execution and the advertising client 310 notifies the advertising server 200 of the execution of the first advertisement application 360 in step 603. In step 605, the advertising server 200 updates its stored list of the advertisement applications currently being executed in the advertisement-receiving terminal 300.

If a second advertisement application 370, or another advertisement application, is executed in step 607, the second advertisement application 370 notifies the advertising client 310 of its execution and the advertising client 310 notifies the advertising server 200 of the execution of the second advertisement application 370 in step 609. In step 611, the advertising server 200 updates its stored list of the advertisement applications currently being executed in the advertisement-receiving terminal 300.

If the advertising server 200 intends to deliver an advertisement to the advertisement-receiving terminal 300 and display the advertisement in real-time, the advertising server 200 determines a target advertisement application by checking the executing-advertisement application list from the advertisement-receiving terminal 300 and then determining which advertisement application it will use to represent the advertisement. Further, the advertising server 200 selects the advertisement most appropriate for the target advertisement application in step 613. In the third embodiment of FIG. 5, the advertising server 200 selects, for example, the first advertisement application 360 as a target advertisement application.

In step 615, the advertising server 200 delivers the selected advertisement to the advertising client 310 in the advertisement-receiving terminal 300 together with an application ID of the target advertisement application.

In step 617, the advertising client 310 selects the pertinent advertisement application, i.e. the first advertisement application 360 by checking the received application ID of the advertisement application. In step 619, the advertising client 310 forwards the advertisement provided from the advertising server 200 to the first advertisement application 360. In step 621, the first advertisement application 360 that has received the advertisement, exposes the received advertisement to the terminal user by representing it.

In a process similar to steps 613 to 621, the advertising server 200 can designate the second advertisement application 370 as a target advertisement application, select a proper advertisement, and deliver the selected advertisement to the advertisement-receiving terminal 300 to provide the selected advertisement to the user in steps 623 to 631.

Meanwhile, when the advertisement application is terminated (or de-registered), this is also reported to the advertising server 200. For example, if execution of the first advertisement application 360 is terminated in step 633, the first advertisement application 360 sends a termination notification message to the advertising client 310 and the advertising client 310 notifies the advertising server 200 of the termination of the first advertisement application 360 in step 635.

In step 637, the advertising server 200 updates the executing-advertisement application list corresponding to the terminal 300, which is stored in its database, i.e. the advertisement application information storage unit 260.

The executing-advertisement application list described above can be managed by the advertisement application information management unit 250 in the advertising server 200, and can be stored in the advertisement application information storage unit 260.

In accordance with the fourth embodiment illustrated in FIG. 6, the advertising server 200 sends, when necessary, a request for a list of currently-executed advertisement applications to a specific terminal and then receives the list.

Referring to FIG. 6, if the first advertisement application 360 is executed in step 701, the first advertisement application 360 notifies the advertising client 310 of its execution in step 703. In step 705, the advertising client 310 updates its stored executing-advertisement application list. If the second advertisement application 370, or another advertisement application, is executed in step 707, the second advertisement application 370 notifies the advertising client 310 of its execution in step 709. In step 711, the advertising client 310 updates its stored executing-advertisement application list. In this manner, the advertising client 310 updates the executing-advertisement application list every time an advertisement application is executed.

Meanwhile, in step 713, the advertising server 200 sends a request for a list of advertisement applications currently being executed in the terminal 300 to the advertising client 310 in order to provide the advertisement to the advertisement-receiving terminal 300. In reply to the request from the advertising server 200, the advertising client 310 delivers the list of advertisement applications currently being executed in its terminal 300 to the advertising server 200 in step 715.

In step 717, the advertising server 200 determines a target advertisement application by checking the executing-advertisement application list from the terminal 300 and then determining on which advertisement application it will display the advertisement, and selects an advertisement most appropriate for the target advertisement application. In this embodiment, the advertising server 200 determines, for example, the first advertisement application 360 as a target advertisement application. In step 719, the advertising server 200 delivers the selected advertisement to the advertising client 310 in the terminal 300 together with an application ID of the first advertisement application 360.

In step 721, the advertising client 310 selects a target advertisement application, i.e. the first advertisement application 360 by checking the received application ID of the target advertisement application. In step 723, the advertising client 310 delivers the advertisement provided from the advertising server 200 to the first advertisement application 360. In step 725, the first advertisement application 360 that has received the advertisement, exposes the received advertisement to the terminal user by representing it.

In a process similar to steps 717 to 725, the advertising server 200 can designate the second advertisement application 370 as a target advertisement application, select a proper advertisement, and deliver the selected advertisement to the advertisement-receiving terminal 300 to provide the selected advertisement to the user in steps 727 to 735.

When the advertisement application is terminated (or de-registered), this is also reported to the advertising client 310 and the advertising server 200. For example, when execution of the first advertisement application 360 is terminated in step 737, the first advertisement application 360 sends a termination notification message to the advertising client 310 in step 739. In step 711, the advertising client 310 updates the executing-advertisement application list. In step 739, the advertising client 310 can optionally notify the advertising server 200 of the termination of the first advertisement application 360.

In the fourth embodiment of FIG. 6, it is assumed that the advertising server 200 sends a request for an executing-advertisement application list to the advertisement-receiving terminal 300 when the advertising server 200 is about to deliver the advertisement. Alternatively, the executing-advertisement application list may be reported to the advertising server 200 when the advertising client 310 sends an advertisement request to the advertising server 200.

The executing-advertisement application list described above can be managed by the advertisement application information management unit 250 in the advertising server 200, and the executing-advertisement application list can be stored in the advertisement application information storage unit 260.

In FIGS. 5 and 6, in order to notify the advertising client 310 or the advertising server 200 of the execution of an advertisement application, the message delivered to the advertising client 310 or the advertising server 200 may include an application ID or an application profile of the advertisement application. If an application profile is included in the message, the advertising client 310 or the advertising server 200 may update a profile of the already stored advertisement application with the newly received profile.

Figure 7:
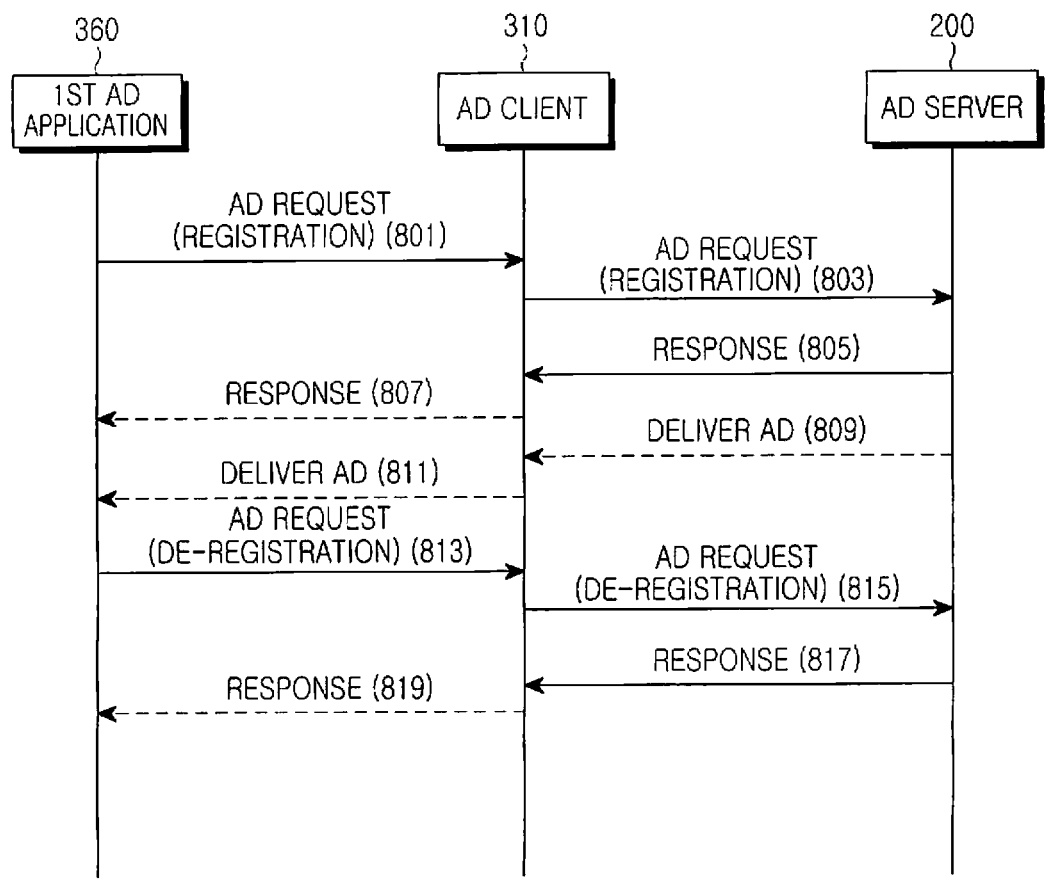
FIG. 7 illustrates a process of registering an advertisement application according to a fifth embodiment of the present invention.

FIG. 7 illustrates a process of registering an application in an advertising server 200 according to a fifth embodiment of the present invention.

Referring to FIG. 7, in step 801, the first advertisement application 360 sends to the advertising client 310 a first advertisement request message that includes an indicator (flag or indication) for application registration and an application profile, in order to register an application in the advertising client 310. The indicator, which is a parameter in an advertisement request message, may have a value of "0" or "1," and can indicate registration or de-registration (or termination) of an application. The indicator and the application profile may be included in the form of metadata.

In step 803, the advertising client 310 forwards the advertisement request message to the advertising server 200. The advertising server 200 stores the application profile and assigns an ID. In step 805, the advertising server 200 sends to the advertising client 310 a response message that includes information such as the assigned application ID, the registered state, advertisement metadata, and a list of advertisements delivered to the advertisement-receiving terminal 300, which list the advertising server 200 may update by checking it during every advertisement delivery, or may be provided from the advertising client 310 in step 803. When a request for a specific advertisement is included in the advertisement request message, the advertising server 200 includes information such as the advertisement and the advertisement metadata in the response message and sends the response message to the advertising client 310.

In step 807, the advertising client 310 forwards the response message to the first advertisement application 360. Step 807 may be performed at any time after receipt of the advertisement request message by the advertising client 310 in step 801. Optionally, this step may be omitted when no other information except for the application registered state is included in the response message responsive to step 801.

Although the application ID is assigned by the advertising server 200 in the above process, the application ID may also be assigned by the first advertisement application 360. In this case, the application ID may be included in an application profile in the advertisement request message sent in step 801 for application registration.

The application registration can be completed through the advertisement request and response process of steps 801 to 807.

Thereafter, through steps 809 and 811, the advertising server 200 delivers the advertisement to the first advertisement application 360 through the advertising client 310 as in the conventional method.

Meanwhile, for application termination (de-registration), the first advertisement application 360 sends to the advertising client 310 an advertisement request message that includes an application ID and an indicator (flag or indication) for the application de-registration, in step 813. For example, the advertisement application de-registration can be performed during uninstalling of the installed advertisement application. In step 815, the advertising client 310 forwards the advertisement request message to the advertising server 200.

Then the advertising server 200 deletes the application ID of the first advertisement application 360 and an application profile corresponding to the application ID. In step 817, the advertising server 200 sends to the advertising client 310 a response message that includes information such as the deleted application ID and the de-registered state.

In step 819, the advertising client 310 forwards the response message to the first advertisement application 360. Step 819 may be performed at any time after receipt of the advertisement request message by the advertising client 310 in step 813. Optionally, this step may be omitted when no other information except for the application de-registered state is included in the response message of step 819.

As is apparent from the foregoing description, the present invention allows a terminal to manage advertisement applications installed therein and to fast detect an advertisement application optimal for an advertisement, enabling fast representation of the advertisement. In addition, a user can register advertisement applications in the advertising server so that the advertising server may manage the advertisement applications installed in the terminal, facilitating an optimized advertisement delivery service provided by considering an application profile as well as user's preference, contextual information and personalization information. Further, a message capacity used for advertisement delivery is reduced, which saves network resources. Moreover, the advertising server can deliver advertisements to a proper advertisement application in real-time, so as to optimize the delivery time of the advertisement to the user.

The embodiments of the present invention can also be embodied as computer-readable codes on a computer-readable recording medium. The computer-readable recording medium is any data storage device that can store data that can thereafter be read by a computer system. Examples of the computer-readable recording medium include, but are not limited to, Read-Only Memory (ROM), Random-Access Memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for managing advertisement applications in a mobile network, comprising:
    receiving, by a processor of an advertising server, a notification indicating execution of an advertisement application from an advertisement-receiving terminal whenever an advertisement application for representing an advertisement is executed in the advertisement-receiving terminal, the notification including an application Identifier (ID) of the advertisement application;
    updating, by the processor of the advertising server, an executing-advertisement application list corresponding to the advertisement-receiving terminal upon every receipt of the notification by storing the ID of the advertisement application in the executing-advertisement application list which is stored in a non-transitory memory of the advertising server;
    receiving, by the processor of the advertising server, a de-registration notification indicating terminated execution of the advertisement application from the advertisement-receiving terminal, the de-registration notification including the ID of the advertisement application;
    deleting, by the processor of the advertising server, the ID of the advertisement application from the executing-advertisement application list in response to the de-registration notification;
    determining, by the processor of the advertising server, one of a plurality of advertisement applications included in the executing-advertisement application list as a target advertisement application;
    selecting, by the processor of the advertising server, an advertisement that can be represented by the target advertisement application, when an advertisement needs to be delivered to the advertisement-receiving terminal; and
    sending, by the processor of the advertising server, an advertisement message including an ID of the target advertisement application and the selected advertisement, to the advertisement-receiving terminal.

2. The method of claim 1, wherein when the advertisement-receiving terminal receives the advertisement message from the advertising server, the selected advertisement is represented by an advertisement application corresponding to the ID of the target advertisement application included in the advertisement message.

3. A method for managing advertisement applications in a mobile network, comprising:
    sending, by a processor of an advertising server, a request for a list of advertisement applications currently being executed in an advertisement-receiving terminal, to the advertisement-receiving terminal, wherein the advertisement-receiving terminal updates the list whenever an advertisement application stored in the advertisement-receiving terminal is executed;

receiving, by the processor of the advertising server, the list from the advertisement-receiving terminal and storing the list in a non-transitory memory of the advertising server;

receiving, by the processor of the advertising server, a de-registration notification indicating terminated execution of an advertisement application in the list from the advertisement-receiving terminal, the de-registration notification including an application Identifier (ID) of the advertisement application;

deleting, by the processor of the advertising server, the ID of the advertisement application from the executing-advertisement application list in response to the de-registration notification;

determining, by the processor of the advertising server, one of a plurality of advertisement applications included in the list as a target advertisement application based on the list;

selecting, by the processor of the advertising server, an advertisement that can be represented by the target advertisement application, when an advertisement needs to be delivered to the advertisement-receiving terminal; and sending, by the processor of the advertising server, an advertisement message including the selected advertisement and an ID of the target advertisement application, to the advertisement-receiving terminal.

4. The method of claim 3, wherein when the advertisement-receiving terminal receives the advertisement message from the advertising server, the selected advertisement is represented by an advertisement application corresponding to the ID of the target advertisement application included in the advertisement message.

5. The method of claim 3, wherein the advertisement-receiving terminal transmits the list when sending a request for an advertisement to the advertising server.

6. An advertising server for managing advertisement applications in a mobile network, comprising:
a non-transitory memory; and
a processor configured to:
receive, whenever an advertisement application for representing an advertisement is executed in an advertisement-receiving terminal, a notification indicating the execution of the advertisement application from the advertisement-receiving terminal, the notification including an application Identifier (ID) of the advertisement application;

update an executing-advertisement application list corresponding to the advertisement-receiving terminal upon every receipt of the notification by storing the ID of the advertisement application in the executing-advertisement application list which is stored in the non-transitory memory;

receive a de-registration notification indicating terminated execution of the advertisement application from the advertisement-receiving terminal, the de-registration notification including the ID of the advertisement application;

delete the ID of the advertisement application from the executing-advertisement application list in response to the de-registration notification;

determine, when an advertisement needs to be delivered to the advertisement-receiving terminal, one of a plurality of advertisement applications included in the executing-advertisement application list as a target advertisement application;

select an advertisement that can be represented by the target advertisement application; and send an advertisement message including an ID of the target advertisement application and the selected advertisement to the advertisement-receiving terminal.

7. The advertising server of claim 6, wherein upon receipt of the advertisement message from the advertising server, the advertisement-receiving terminal is further configured to represent the selected advertisement by an advertisement application corresponding to the ID of the target advertisement application included in the advertisement message.

8. An advertising server for managing advertisement applications in a mobile network, comprising:
a non-transitory memory; and
a processor configured to:
send to an advertisement-receiving terminal a request for a list for advertisement applications currently being executed in advertisement-receiving terminal, wherein the advertisement-receiving terminal updates the list whenever an advertisement application stored in the advertisement-receiving terminal is executed;

receive the list from the advertisement-receiving terminal;
store the list in the non-transitory memory;
receive a de-registration notification indicating terminated execution of an advertisement application in the list from the advertisement-receiving terminal, the de-registration notification including an application Identifier (ID) of the advertisement application; and delete the ID of the advertisement application from the executing-advertisement application list in response to the de-registration notification, wherein the processor is further configured to make the request for the list when an advertisement needs to be delivered to the advertisement-receiving terminal, and wherein the processor is further configured to:
determine one of advertisement applications included in the list as a target advertisement application depending on the list;

select an advertisement that can be represented by the target advertisement application; and send an advertisement message including an ID of the target advertisement application and the selected advertisement, to the advertisement-receiving terminal.

9. The advertising server of claim 8, wherein the list is delivered to the advertising server using an advertisement request sent by the advertisement-receiving terminal.

* * * * *